United States Patent [19]
Adegeest et al.

[11] Patent Number: 5,889,932
[45] Date of Patent: Mar. 30, 1999

[54] METHOD OF CHECKING GRAPHICAL DATA FOR CONFORMITY TO GRAPHICAL DESIGN RULES

[75] Inventors: Frank Adegeest, Sint Jansteen, Netherlands; Leo De Wael, Lokeren; Patrick Bergmans, Gent, both of Belgium

[73] Assignee: Barco Graphics N.V., Belgium

[21] Appl. No.: 642,299

[22] Filed: May 3, 1996

[51] Int. Cl.⁶ .................................................. G06F 15/00

[52] U.S. Cl. ............................................................ 395/117

[58] Field of Search ..................................... 395/133, 110, 395/117; 349/433; 364/468.1, 468.09, 552; 53/411

[56] References Cited

U.S. PATENT DOCUMENTS

| | | | |
|---|---|---|---|
| 4,873,643 | 10/1989 | Powell et al. | 364/468 |
| 5,619,635 | 4/1997 | Millman et al. | 395/768 |

OTHER PUBLICATIONS

Harrel, "Publish without perishing: Adobe Systems' Pain and Publish, Corel Systems' Venture 5, Microsoft Publisher for Windows 95, Serif PagePlus Publishing Suite 3.0," Home Office Computing, Jan. 1996, vol. 14, No. 1, p. 74(4).

LePage, "Next PageMaker chapter adds tools, Web features," MacWeek, Oct. 28,1996, vol. 10, No. 41, p. 1(4).

Dengel, et al., "From Paper to Office Document Standard Representation," IEEE Computer Magazine, Jul. 1992, vol. 25, No. 7, pp. 63–67.

*Primary Examiner*—Mark R. Powell
*Attorney, Agent, or Firm*—Dov Rosenfeld

[57] ABSTRACT

Disclosed is a method for improving computer aided graphical design with a design rule checker. A preferred embodiment of the invention is a computer program which when loaded in a computer checks a graphical design for conformity to a set of graphical design rules such as printability rules, legal packaging rules, company style rules, and aesthetic rules. The program may be operated in an interactive mode to provide feedback while a design is being created, or in a batch mode after the design is completed. Specific rules can be customized and adapted for appropriate printing processes, company styles, legal rules, and aesthetics.

24 Claims, 4 Drawing Sheets

METHOD OF CHECKING GRAPHICAL DATA FOR CONFORMITY TO GRAPHICAL DESIGN RULES

FIELD OF THE INVENTION

The present invention relates generally to the field of graphical data processing and more specifically to methods for analyzing and correcting graphical data for conformity to graphical design rules.

BACKGROUND OF THE INVENTION

In the present graphic design process, an artist typically uses a computer running a graphic design program to compose and edit the design. The design is stored as a graphical data file which is ultimately sent to an output process for display. In commercial design, the output process might include a preprint process followed by the process of printing itself. Depending on the particular medium, the printing process will vary. For example, the processes for printing cereal boxes, the sides of trucks, and brochures vary in their technical details and each imposes a different set of constraints.

Because the work of today's graphical designer involves computers, various printing processes, and numerous media, the creative artist is usually burdened with the task of combining the intuitive process of design with the analytical and technical knowledge of the computers and printing processes involved. For example, a designer may create very thin lines that cannot be reproduced due to the technical constraints of a particular printing processes. There are many other similar constraints that affect the printability of a design as well. For example, different printing processes have characteristic registration error tolerances, minimum printable color intensities, and minimum resolvable gaps between distinct graphical elements. Because these many constraints vary between different printing processes, keeping them all in mind is distracting to the creative process of the artist. Moreover, even if the graphical elements created by the artist are printable by the selected printing process, there may be small errors or undesirable features in the design that are easily overlooked. For example, a stroke forming the boundary of an object may have be partially covered by another object.

Consequently, a designer may produce a creative design that appears to be printable on the computer, but which may not, in fact, reproduce as intended when sent to the selected printing process. Or the design may print as intended in one printing process but not in another. Time and money are often spent printing such designs only to discover the mistakes after it is too late. On the other hand, it is time-consuming and detrimental to the creative process of design for the artist to check all the graphical elements of a design for conformity to the constraints of a particular printing process and make appropriate modifications.

In addition to design rules imposed by the medium or printing process, there are other types of rules that constrain the design of graphic art. For example, an artist producing many designs for a company advertisement may be constrained in the use of certain colors or fonts traditionally used by the company. The design of packages for a product line may also be constrained by certain design rules such as color and font. Other rules of design involve more general aesthetics. For example, there may be certain design rules for brochures that specify the balance of colors and the spacing of text. Such rules may be different for packaging or for annual reports or other applications.

There are specific legal rules that apply to certain package and advertisement designs. For example, cigarette packaging and advertisements are required by law to have warning labels having a certain minimum relative size. Certain alcohol labels have similar requirements. Food labels have requirements regarding ingredients, nutrients, and weight. Since these legal rules vary from country to country and product to product, the artist is burdened in the creative process.

Therefore, there has long been a need for a way to free the graphic design artist from the burdens of many complicated rules of various types which constrain the design. There is also a need to improve the efficiency of graphic design and reduce the problems and errors encountered due to the constraints imposed by printing processes, company styles, aesthetics, regulations and other design considerations.

OBJECTS AND ADVANTAGES OF THE INVENTION

In view of the above, it is a primary object of the present invention to facilitate the creation of digital artwork which can immediately be used in a production environment and prepared for printing. More specifically, it is a primary object of the present invention to relieve the graphic artist from the burden of knowing and checking for conformity of a graphical data with various forms of design rules such as printability rules, company style rules, regulations, aesthetics, and other design considerations. It is a further object of the present invention to facilitate the identification and correction of design rule violations in digital artwork. It is an additional object of the present invention to provide a design rule checker which is flexible and adaptable to different media, printing processes, and types of design. It is a further object of the present invention to provide a design rule checker that does not impose inappropriate limitations or restrictions on the graphical artist during the creative process. These and other objects and advantages will be apparent from the following description and figures.

SUMMARY OF THE INVENTION

The invention provides a method of processing graphical data representing the graphical objects of design. It includes the step of identifying in the design a graphical object which violates a graphical design rule, and then modifying the object so that it conforms to the rule. Depending on the mode of operation, the modification may be performed manually by the user or automatically with or without user intervention. The preferred embodiment also includes provisions for producing output such as identification of the object, an explanation of how the object violates the rule, and one or more suggested changes to the object. The preferred embodiment also provides for checking the design for conformity with different types of design rules such as printability rules, legal packaging rules, company style rules, and aesthetic rules. To further enable to checking for design rules involving text data, the preferred embodiment includes a method for recovering text data from contour data.

DETAILED DESCRIPTION

General Operation

A preferred embodiment of the present invention is a method implemented on a computer workstation. The steps of the method are performed by the computer executing a software program integrated with a layout and illustration package. The program may be used in an interactive mode during the design stages to check graphical elements as they are created. Alternatively, it may be used in a batch mode to identify and correct errors in a graphical art work after it has been completed. In the interactive mode of operation, the program allows for selective rule checking so that the artist may be immediately notified of certain errors during the creative design process, while postponing notification of other errors. Designs originated in such an environment should be totally compliant with the applied design rules.

The artistic design is represented as a database of graphical objects in a computer memory or digital storage device associated with the workstation. The graphical objects fall into several distinct categories well-known in the art of computerized graphic design (e.g., line art object, text, images). Also stored in the memory or storage device is a database of design rules. Rules are organized in rule sets associated with object categories. New sets and rules can be defined by the user with associated sets of corrective actions. Some rule sets are general and can be used for each installation (e.g., printability rules) other rules are very specific and must be tuned for each application area (e.g., company style guides). Moreover, as the program is used with more designs, the rule sets may be refined and customized to suit the particular application area. An "experienced" program, therefore, will be optimized for the types of designs most frequently encountered in the past by those who have used the program. The rules can be classified into four major categories: printability rules, legal regulations, company style guides and aesthetic rules. Printability rules are rather general, while the three other types of rules require more user customization and input for the specific situation.

Figure 1:
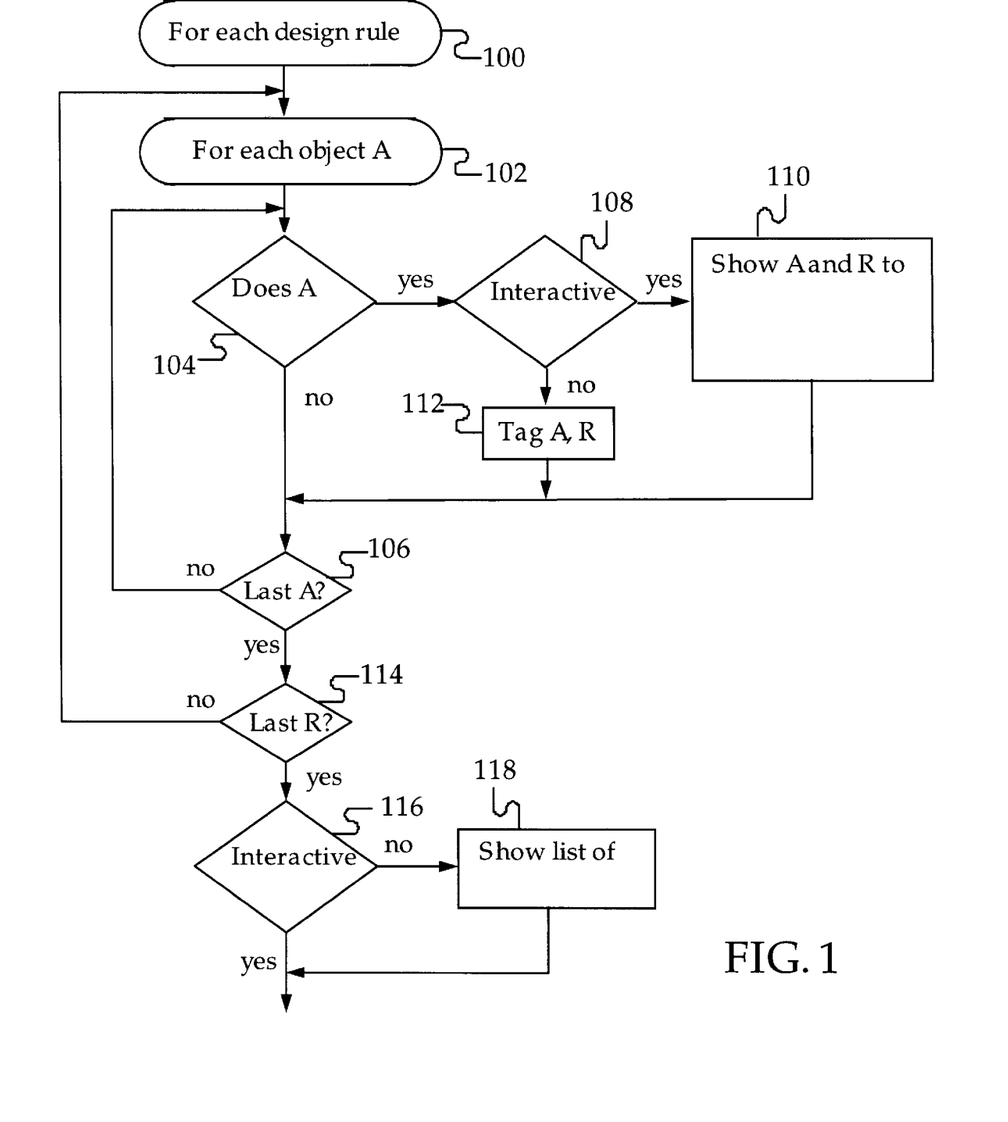
FIG. 1 is a flowchart of the general method of the invention.

As shown in FIG. 1, the computer program, which is the preferred embodiment of the method of the present invention, analyzes the graphical objects and checks for violations of the design rules. Two loops (initialized by blocks 100 and 102) iterate through a list of selected design rules and a list of selected graphical objects. The program checks if a given object A violates a given design rule R (block 104). If not, it checks if A is the last object in the list (block 106), and if A is not the last object, A is set to the next object in the list and control is returned back to block 104 where the new object A is checked against the design rule R. If the object A violates R, then the program checks the mode of operation selected (block 108). If interactive mode is on, the program immediately shows the user the object A, the rule R it violates, suggests a change to the object that will correct the object, and modifies the object according the user response (block 110). If interactive mode is off, then the program simply tags the object A and the rule R (block 112) or otherwise records the violation for later recall. In either mode, the program then checks if A is the last object (block 106) and, if not, loops back up as before to block 104. If A is the last object, then it checks if R is the last rule in the list (block 114). If R is not the last rule, then R is set to the next rule in the list and control is transferred back up to block 102 to begin checking objects. If R is the last rule, then the program checks if interactive mode is on (block 116). If not (i.e., a batch mode is on), the program lists the number and type of rules violated by the entire design without identifying particular objects (block 118). Alternatively, it may identify only objects which violate a certain rule or class of rules. In another alternate mode, a rule violation list is actively updated and displayed when objects are created and modified, providing the artist with summary feedback during the design process. The type of rules which appear on the list may be customized by the artist so that, for example, only printability rule violations are displayed and no legal packaging rule violations are displayed.

In an interactive mode of operation, after identifying an object in violation of a rule, the computer program, which is the preferred embodiment of the method of the present invention, explains which rule is violated, zooms in on the object and indicates in detail the features of the object which violate the rule. A preferred embodiment also provides the user with one or more suggested changes to the object. For example, if a stroke is too thin, the user can select whether to enlarge it to the inside of the object, to the outside, or equally both ways. Once the object and rule violation are identified, the user may then decide to ignore the violation, select one of the suggested changes, change the object in another way, or change the rule itself. The program then continues on to the next object in the design. The user may decide also to have the program automatically make analogous corrections to similar objects with the same rule violations. For example, the program can automatically increase the thickness of all lines that are too thin for the presently selected printing process. Or the program might scale all line thicknesses proportionally. Note that, in addition to selecting the types of rules of interest, the user may also select a certain subset of objects in the design for rule checking. These features provide the program with flexibility and adaptability.

In a preferred embodiment, the procedure for checking a set of objects for conformity with a set of design rules may be summarized as follows. First, a group of objects is selected. For each object A in the group, the object A is checked against all enabled rules that apply to the class of objects to which A belongs. If the rule is not violated, the program goes on to the next object. If the rule is violated and the user has selected batch mode, then the object is tagged with the rule violation and the program goes on to the next object. If the rule is violated and the user has selected interactive mode, then the object A is highlighted, an explanation is given of the violation, a selection of suggested changes is proposed, and an action is taken as requested by the user, i.e., correct the object as suggested, skip the object, change the rule, or change the object is some other way.

Printability Design Rules

A preferred embodiment of the invention includes the ability to check graphical objects for compliance with printability design rules. Printability rules are constraints imposed by the printing process that will be used for the particular design or set of designs being worked upon. All the printability issues are based on process related parameters which may be configured and customized by the user. These parameters are typically set each time the printing process is changed. Different sets of parameters may be stored so that the user may easily switch between printing processes if desired.

For a given printing process there are several printability parameters. For example, the minimum positive line thickness specifies the thinnest width that the printing process is able to produce as a printed line on top of a white or colored background. Another parameter is the negative line thickness, which specifies the thinnest width that the printing process is able to produce by masking out a portion of print surrounding it, i.e., a line defined by the absence of ink. Another parameter is the minimum color percentage for flat-tone ink relations. For certain printing processes a minimum color intensity, say below 5%, will not be printed. Similarly, certain printing processes will print 100% solid color intensities above a maximum value, say 95%. There is also a parameter specifying the number of inks that are available. Another parameter is the spatial tolerance for die-cutting which requires that any graphic elements be placed a minimum distance within the die-cut. Similarly, a cutting tolerance determines how far inks should bleed out past the cut so as not to leave a white gap. The press also has registration error tolerance parameters. These will limit the thickness of multi-ink graphical elements below a certain width. Thus there is an interdependence between thickness, tolerance, and number of inks.

In summary, printability rules are general rules that can be adapted to the particular situation by a number of printing process parameters. They check that what is in the design also appears on the press as intended. Examples of process parameters are the width of smallest line that holds on the press (minimum positive line width), the width of smallest hole that does not fill (minimum negative line width), the shift between the plates for the different inks on the press (registration error), the maximum number of inks that can be printed in one pass through the press (maximum number of print units), the minimum percentage of an ink that must used in a color to hold on the press (minimum color percentage) and the maximum ink percentage that can be distinguished from the full color (maximum color percentage).

The printing process parameters depend on the process, the material printed upon, the print quality and the specific press. A stored database contains a number of default values for common situations, as well as user-customized values. Examples of common processes are offset, flexo, gravure, silk-screen, lithopress and letterpress. Examples of common materials are paper, carton, film and label. Quality is typically high or low and is often related to the rotation speed of the press. Users can add their own processes, materials and qualities and add their own values for the parameters.

Ink Thresholds

The ink thresholds are parameters that depend on the type of press, the material printed upon, the printing process used and the required quality. For example, a process may have a low ink threshold of 5% and an upper ink threshold of 95%. In this case, if an object has color components 6% cyan, 96% magenta, 7% yellow and 10% black, will violate the ink threshold rule. The program will suggest that the color components be changed to 6% cyan, 95% magenta, 7% yellow and 10% black. Similarly, an object with color components 3% cyan and 99% yellow will be changed to 5% cyan and 100% yellow.

The method for checking objects for conformity with the ink threshold rule is as follows. For each object, check first if the object is visible. If visible, then retrieve the ink amounts for its solid colors and compare them with the lower and the upper threshold values for the inks. For each such amount between 0% and lower threshold value, suggest changing it to zero or the lower threshold value. For each such amount between the upper threshold value and 100%, suggest changing it to the upper threshold or 100%.

Color Gradation

Figure 2:
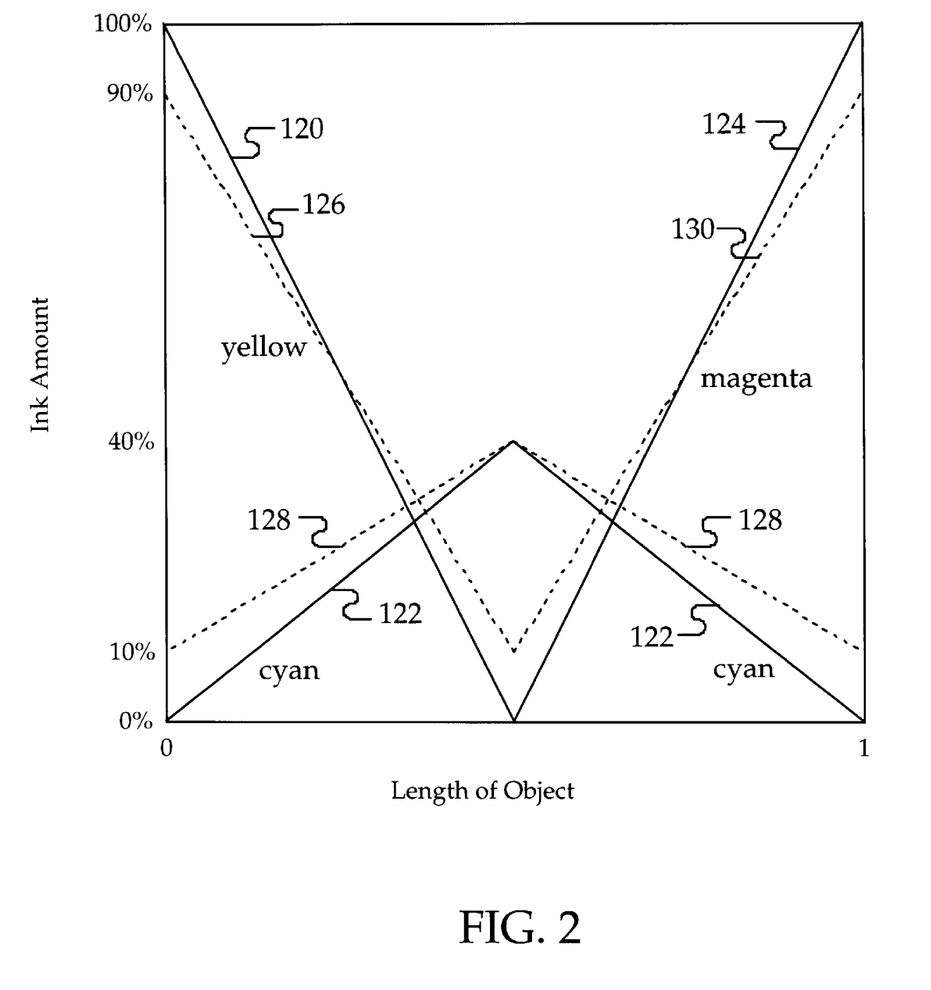
FIG. 2 is a graph illustrating color gradations.

Changes in colors components due to ink thresholds can cause color discontinuities in objects with color gradations. For example, an object such as a rectangle may have continuous gradations of cyan magenta and yellow defined along its length as illustrated in FIG. 2. Yellow (curve 120) gradually falls from 100% at the left to 0% at the middle, cyan (curve 122) rises from 0% at the left to 40% at the middle then falls to 0% at the right, and magenta (curve 124) rises from 0% at the middle to 100% at the right. If the (typically pre-specified) ink low threshold is 10% and the high threshold is 90%, then there will be discontinuities in the color gradation at the points along the length of the object where the lines cross 10% and 90%. To correct these discontinuities, the minimum and maximum color intensities of the gradations are adjusted to the minimum and maximum threshold values. Thus the colors in the example are modified so that yellow (curve 126) gradually falls from 90% at the left to 10% at the middle, cyan (curve 128) rises from 10% at the left to 40% at the middle then falls to 10% at the right, and magenta (curve 130) rises from 10% at the middle to 90% at the right.

The general method is as follows. For each object, retrieve the ink amounts for the color gradations over the visible part of the object. Then find the areas of the color gradation that apply to the object and compare the ink in each color with the adjacent colors. The ink range is divided into three regions: above upper threshold, middle area (safe area) and below lower threshold. Compare the ink values of each of the colors two by two. If the ink values are in the same region for both colors there is no problem. If they are in different regions the ink values must be shifted to the boundaries of the middle region.

Thin Strokes

One of the attributes of a line is its thickness or width. Also, the border of an object, called a stroke, has a width that will be distinguishable if it is given a color different from the interior of the object (the fill). Like other small graphical elements, if it is too small it will not be printed on the press. For example, suppose one is printing to papers in a high quality offset process having the following parameters: minimum positive line width: 0.17 mm, minimum negative line width 0.20 mm, press tolerance: 0.25 mm. Then the corresponding critical sizes are: positive object distance= 0.17 mm, registration distance=0.70 mm. In this situation, an isolated line with width 0.18 mm and color 45% cyan is printable, but an isolated (positive) line with width 0.12 and any color is too thin and will not print. Any line with width 0.30 mm and color 30% cyan 45% magenta is too thin because of possible registration error. A non-isolated line with width 0.45 mm and color 23% yellow is also too thin because of possible registration error.

Similarly, a stroked object with stroke width 0.19 mm and color 23% yellow 52% magenta and a fill of 70% cyan is too thin due to possible registration error. A stroked object with stroke width 0.19 mm, color 23 % yellow and a fill of 70% cyan is also too thin due to possible registration error. A stroked object with width 0.19 mm and color 50% black and fill of 70% cyan is OK. An isolated stroked object with width 0.16 mm and color 23% cyan and fill of 15% yellow is too thin because it is below the minimum positive line width.

As would be clear to those in the art, in this and other cases in any implementations of the method of the present invention, other values of the thresholds may be used without deviating from the scope of the invention.

A method for detecting violations of this design rule is as follows. For each object in the design, first check if the object is visible and if the stroke has a different color from the fill. If these conditions are not both satisfied, then skip to the next object. Otherwise check one of three cases. Case 1: the stroke contains more than one ink; if its width is below the registration threshold, then the stroke violates the rule. Case 2: the stroke contains no inks, i.e., is defined negatively as the absence of ink; check if the stroke is embedded in an object with one ink and the width is below the negative object distance, or if the stroke is embedded in an object with several inks (or overlaps objects having several distinct inks) and the width is below the registration distance. If either is the case, then the stroke is too thin. Case 3: the stroke contains just one ink; check if the stroke is isolated and has a width less than the positive object distance, or if the stroke is overlapped by another object or by a fill of different color and the width is less than the registration distance. In either case, the stroke is too thin.

Thin Parts

Figure 3A:
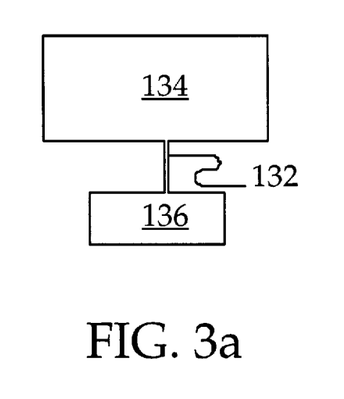
FIG. 3a and 3b are examples of an object with a thin part.
Figure 3B:
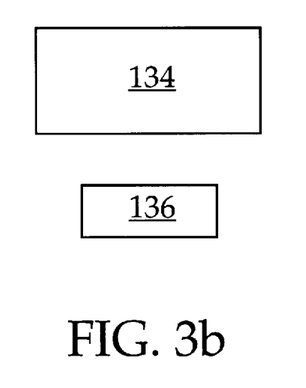

If an object has a portion that is too narrow, such as the portion 132 of the object shown in FIG. 3a, then, if the narrow portion 132 is smaller than a certain threshold for the printing process, the object may break into two parts 134 and 136 when printed, as shown in FIG. 3b. A method for detecting objects that contain parts that will disappear when printed on the press is as follows. For each object, first determine the visible part of the object and find the critical distances in the object. (The critical distance for an area of an object is the distance that the object can be expanded or contracted in size before it fragments into separate objects. The spreading method for determining critical distances is described later.) Check four cases. Case 1: the object contains several inks; if the critical distance is less than the registration distance, then there is a possible registration problem and the design rule is violated. Case 2: the critical area contains one ink and is isolated; if the critical distance is less than the positive object distance, then the critical part is too thin. Case 3: the critical area contains one ink and is not isolated; if the critical distance is less than the registration distance, then there is a possible registration problem. Case 4: the object contains no inks; if the critical area is embedded in an object with one ink (or overlaps objects containing only on ink), and if the critical distance is less than the negative object distance, then the part is too thin. Alternatively, if the critical area is embedded in an object with several inks (or overlaps objects containing several inks) and if the critical distance is below the registration distance, then there is a possible registration problem and the object is too thin.

Objects Too Close

Figure 4A:
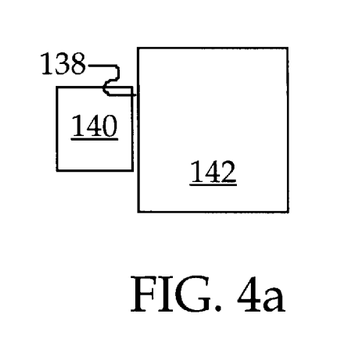
FIG. 4a and 4b are examples of two objects that are too close together.
Figure 4B:
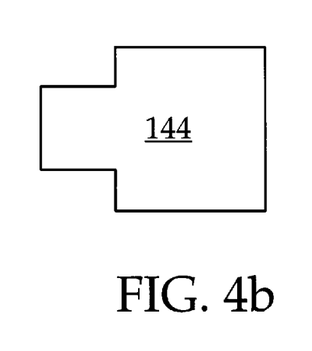

Problems with thin parts arise when the border of an object is too close to itself in some area. As shown in FIG. 4a, there are similar problems when a portion 138 of the borders of separate objects 140 and 142 are too close. In effect, two objects that are too close create a background with a thin part 138. Consequently, the thin part 138 may not print, mistakenly merging the two objects 140 and 142 into one object 144, as shown in FIG. 4b. A method for finding close objects is as follows. First, find an object that is a background for two objects and get the visible part of the background. If the two objects have the same ink and if the background has a critical area that overlaps with both objects, then the objects are too close. Alternatively, if the two objects have more than one ink or different inks, and if the background has a critical area that overlaps with both objects, then the objects are too close.

Find Visible Parts (Flatten Design)

Figure 5A:
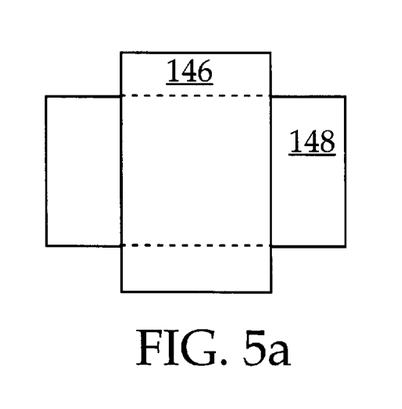
FIG. 5a and 5b show the visible parts of two rectangles.

Because graphical objects exist in layers so that they may overlap and cover each other, it is only necessary to check errors for objects and parts of objects that are visible. To determine the visible parts of objects, however, one must "flatten" the layers into one visible layer so that design rules can be checked against what will actually appear. FIG. 5a illustrates a simple example of a design consisting of a first rectangle 146 overlapping a second rectangle 148.

Figure 5B:
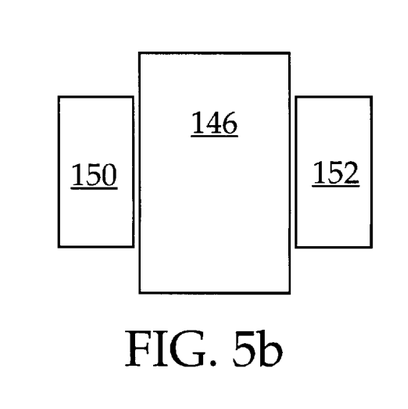

Because rectangle 146 covers the center of rectangle 148, the resulting flattened file, shown in FIG. 5b, consists of three rectangles: the unchanged rectangle 146 on top and two rectangles 150 and 152 corresponding to the two visible portions of the rectangle 148 underneath.

In the preferred embodiment, the objects in the design are ordered from top to bottom. To determine object overlap, a box sort method is used. This method stores objects by location on the page. The method consists of two parts. The first part iterates over all objects, starting from the top and going to the bottom. For each object, relevant masks are applied to the object and the bounding box of the object is computed. The object depth, or object stacking order, is stored. Then the object and bounding box is stored in a list. The list of objects is then sorted by bounding box. The second part of the method also iterates over all objects from top to bottom. For each object, the following steps are performed. First find all other objects that overlap the object bounding box. Then select from the sorted object list generated in the first part all objects that are laying above the object. Then select from the list all objects that really intersect the object. Form the union of the selected objects and subtract it from the original object. Store the resulting object as the visible part of the original object.

There are several variations on part two of the method. Performance depends on the actual graphical objects in the design. One variation subtracts each individual object from the original object, instead of making the union first.

The performance of the method may also be improved as follows. Since visible parts are computed from top to bottom, the visibles of all objects that overlap a given object are already known. Thus each object may be replaced in the box sort by its visible part. This reduces the number of objects that intersect each other, but requires a new sort at the end. More specifically, this method may be performed with the following steps. For each object (from top to bottom), find all other visibles that overlap its bounding box and select from the list all visibles above the object and all visibles that intersect the object. Form the union of the selected visibles and subtract it from the original object. (Alternatively, subtract each selected visible individually.) Then store the resulting object as a visible of the original object, remove the original object from the box sort, and add the visible object to the box sort. Finally, sort the elements in the box sort by bounding box.

Find Critical Distances (Spread Algorithm)

Figure 6:
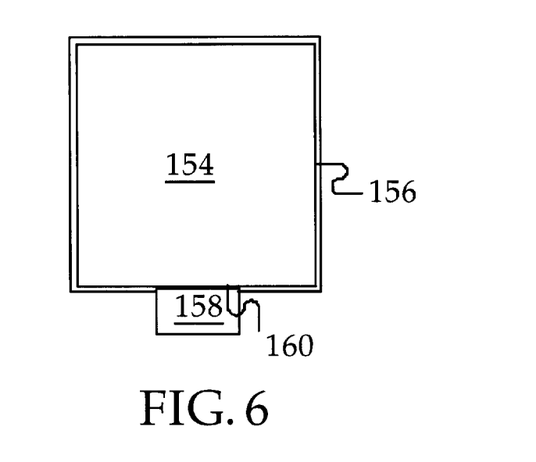
FIG. 6 shows the importance of calculating visible parts.

As mentioned previously, many design errors relating to printability may arise because boundaries are too close to each other, e.g., thin parts of a single object or separate objects that are too close to each other. These types of errors are not evident by a superficial inspection of the object attributes such as stroke thickness. For example, FIG. 6 shows an object 154 with a stroke 156 whose thickness is sufficient to print. A second object 158, however, partially covers stroke 156, resulting in a portion 160 of the stroke that is too thin to print. To find these types of errors the design must first be flattened to determine the visible portions of the objects. Methods for performing this step were just discussed above. Once the visible portions of objects have been determined, however, it is then necessary to calculate the critical distances between visible parts. To accomplish this, the preferred embodiment uses the following spreading method.

To determine critical distances for an object or pair of objects, the method converts all attributes to objects (e.g., converts strokes to contours), calculates visible parts, spreads the object boundary or boundaries (either inward or outward), and checks for an intersection of boundaries. By measuring the amount of spread required to cause an intersection, the critical distance is determined. This critical distance can then be used to check for violations of design rules (e.g., thin parts, objects too close) as discussed previously.

Note that if two objects of the same color overlap, their union is taken when converting to visible parts, so a thin part of a red object on a red background, for example, would not generate an error. Thus, the generation of errors will depend on whether an object is isolated or not, i.e., whether it overlaps with or is too close to another object.

Critical distances are important if a thin object has a color that contains two or more inks, since the film of one ink can shift in one direction and the other film can shift in the opposite direction. As a result, the overlap between the two inks is reduced. To ensure an overlap of the inks the object must be at least registration distance wide. Also, if two objects containing different inks are close too each other, the ink of the object that is printed last may cover the object printed first. So an object that is close to another object printed with different ink must at least be registration distance away from the other object. Similar considerations apply to negative object distances, as discussed earlier. The registration error distance is defined to be the negative line width plus twice the press tolerance plus.

Figure 7:
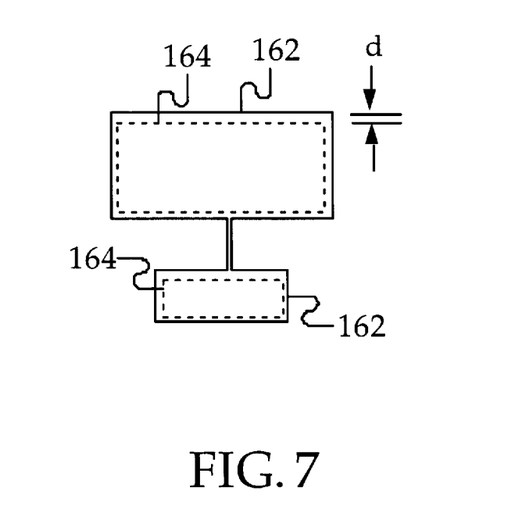
FIG. 7 illustrates the process of spreading.

The method for the determination of the critical distance is based on an object spread tool. FIG. 7 shows an example of how the spreading is used to determine the thin part of the object in FIG. 3a. As the outline 162 is moved inward a distance d to a new outline 164, the object breaks into separate pieces, as was seen in FIG. 3b. By determining the distance d at which this break takes place, the critical distance of the object is found. In particular, if the object breaks after spreading a distance d, then it contains a critical area with a critical distance smaller than 2 d. A modification of the spread method allows the program to identify the location where the break of the object occurs (the critical area).

More precisely, the method may be described as follows. It iterates over all objects. For each object it spreads the object by a distance d equal to half the registration distance. If the object holds together then there is no problem. Otherwise the object breaks into separate pieces and further conditions must be checked. Case 1: the object contains more than one ink; then there is a registration problem. Case 2: the object is isolated; then spread over half the positive threshold distance and check if the object holds together. If it holds together, then there is no problem. Otherwise it violates the minimum positive line width rule. Case 3: the object contains no ink; then spread it over half the negative threshold distance and check if object holds together. If it holds together, then there is no problem. Otherwise it violates the negative threshold distance. Case 4: the object contains one ink; then if the critical area is not isolated, there is a registration error. Otherwise the critical area is isolated. Spread over half the positive threshold distance. If the object holds together then there is no problem. If the object separates, then it violates the minimum positive width rule.

Isolated Objects

As part of some methods it is necessary to determine isolated objects. An object is isolated when it does not overlap with other objects or when no other ink is printed over it. Isolated objects can be identified as follows. For a given object, compute the intersection of the object with all other objects. If there is no intersection then the object is isolated. Otherwise, for each of the intersecting objects, if an ink of the intersecting object is printed later than an ink of the original object, then the object is not isolated. If no ink is printed later than the inks of the original object then the object is isolated.

Die Rule

A die is a simple polygon whose edges define the lines where a package is folded or cut. In a package the die must be closed and connected. This means that there can only be one object that functions as the die. A simple method can check the file for such an object and give an error if there is more than one.

Text Rules

There are often design rules that place restrictions on text. For example, the location of text may be restricted to certain regions of the layout and text may not be too close to margins and images. In some cases text must be located in so-called safe text areas. A method for checking conformity with such a design rule is as follows. For each object that is a textbox, expand the textbox by the minimum print-to-cut distance. If the expanded text overlaps an external image, extends outside the die, overlaps an edge of the die, or overlaps with an edge of the safe text area, then there is a text design rule violation.

Bleed Rule

As mentioned above, a die is a border that indicates the margins of the package or other design. It has no attributes and thus produces no ink on the press. Because of limitations in cutting accuracy in the printing process, objects that terminate at the die may be shifted inside or outside the actual die, producing a white gap between the actual cut and the edge of the objects. To avoid this problem the objects must be designed to bleed over the edge of the die a minimum amount. A method for checking this design rule is as follows. First, spread the die outward a bleed distance determined by the cutting tolerance.

For all objects that overlap the grown die, if the object contains ink then subtract the object. If any object touching the original die remains after all such overlapping objects are checked, then there is not enough bleed of the objects.

Role Identification

When a design must be checked for its contents there must be a way to identify the role of a graphical object. In the prior art there are several methods for role identification. The first method is for the designer to add a label to each created graphical object. These annotations attach two strings to each object. A second method is to define graphical styles. The designer then has a choice between a set of predefined styles (e.g., die, cutline, text area margin, logo, front panel, top, bottom, back panel, etc.) and can create additional styles. A third method is to use templates (intelligent dies) to which styles are added. When a new design is started a template is loaded from a library.

Because these previous methods require a lot of work and discipline from the designer a new method has been developed that tries to infer the purpose of a graphical object from its structure and relation with other graphical objects. It is based on symbolic reasoning about graphical objects. A method for performing this identification involves classifying each graphical object, finding the relations between objects, and matching aggregates of objects with a library of template compositions.

Generic objects have attributes such as color, bounding box, position, stroke width, and transformation. More specialized objects have additional characteristic attributes. An object may be classified as follows: textline, textbox, external file, object with several contours, and object with one contour. An object with one contour is further classified as an open object or a closed object. An open object is classified as either an object defined by splines or an object defined by vectors, such as a polyline or line. A closed object is also classified as either an object defined by splines, such as an ellipse or circle, or an object defined by vectors, such as a polygon. Polygons are further classified into polygons whose interior angles are all less than 180 degrees and all other polygons. The former group includes triangles, polygons with four sides (such as trapezoids, parallelograms, rectangles, squares, and rhombuses), and polygons with more than four sides.

Generic objects A and B can have certain general relations which fall into the following categories. A contains B, meaning A is a filled object and B is completely inside of A but in front of it. A covers B, meaning A is a filled object and B is completely inside of but behind A. A surrounds B, meaning A is an object containing holes and B is in one these holes. A overlaps B. A is close too B, meaning the bounding boxes of A and B overlap, but do not actually overlap. A is to the left of B. A is to the right of B. A is above B. A is below B. Furthermore, specific types of objects can have characteristic relations specific to their structures.

To match aggregates of objects with a library of template compositions, the object types and relations found are compared against stored templates. For example, a design may contain registration marks which can be identified by finding three objects of the same color where one object is a circle and two objects are lines that are mutually perpendicular, intersect at the center of the circle, and have lengths nearly equal to twice the radius of the circle. A die can be identified as a closed polygon without a fill that surrounds most of the objects in the design.

Remove Nonprintable Objects

Some objects may exist in the design but do not affect the visible part of the design. For example, completely hidden objects, completely masked objects, objects completely contained in other objects of the same color, and objects having a bounding box smaller than the positive object. Objects such as these are design errors in the sense that they are elements of the design that have no visible effect. They can therefore be removed from the file. Correcting this design error has the additional benefit of reducing the superfluous objects of the design and improving performance while printing.

Legal Rules

Certain designs such as packages are subject to legal packaging regulations or rules. In order to facilitate compliance with such rules, the preferred embodiment includes provisions for legal design rule checking. The designer may create a box which is called, for example, Netweight Statement, which is a template textbox with "Netweight" followed by blank spots for the specific values. These templates can have certain styles linked to a kind of text database to ensure that the text spelling and abbreviations conform to the rules of packaging text. An example of a legal packaging rule is the health warnings that must be present on cigarette boxes. These warnings must occupy a certain area of each side of the package. The font must be at least a given size and color. In this case, a package template is defined having certain required area fractions, colors, font styles, and font colors for the front, left, right, and back panels of the package. The purpose of text sections can be recognized based on keywords. For example, keywords such as fat cholesterol, sodium, and protein identify a text section as a nutrient name section. Keywords such as hazard, danger, warning identify a text section as a warning section. The program then scans the design for text boxes, checks for keywords and classifies the text boxes based on the keywords. The position and property of each text box is then compared with the requirements for its class as defined in the appropriate legal design rules applicable to the design.

The identification of keywords in the above method presupposes that the text in the design is in the form of a textbox type object. For various reasons, however, the text in a design may be represented by lines and other objects. For example, the design may have been scanned without the subsequent application of an optical character recognition (OCR) transformation. Or the designer may intentionally convert an existing font so that it may be adapted and customized for the particular purposes of the design. In any case, in order for the legal design rules (and other rules involving text) to be checked, the text must be recognizable as a text object. The present invention, therefore, provides a method for recovering text information.

The text recovery method is a reversal of the process of generating characters for display from text data. In contrast to methods for OCR which determine characters from pixel representations of text, the present method determines characters from a representation of text in terms of lines, contours, and other objects. By classifying characters based on properties such as the number of contours, the relations between contours the number of points in each contour, and the relative lengths of contours segments, the present method is able to match a set of contours with a character.

A method implementing the present method of text recovery includes two parts, a learning phase and a recovery phase. In the learning phase, the following seven properties are determined for each character and style in a set of fonts randomly chosen from those available in the computer system running the program which is the preferred embodiment of the present invention.

1. Number of contours in the character (e.g., C has one contour, O has two contours, B has three contours).
2. Number of groups of contours (e.g., i has two groups, a has only one group).
3. Number of contours in each group (e.g., i has two groups with each one contour).
4. Vector v corresponding to a bounding box around the character. The components of the vector correspond to 16 cells of the box in a 4×4 arrangement indexed sequentially from the upper left to the lower right. The values of a component indicates whether or not the corresponding cell contains a portion of the character: $v[i]=1$ if the $i^{th}$ cell contains a piece of the character, and $v[i]=0$ otherwise. The Euclidean Distance function is used to measure the distance between the vectors of the characters.
5. Density: the percentage of the bounding box that is filled (e.g., – is 100% filled, 1 is less than 100% filled).
6. ratio of height to width of the bounding box.
7. number of straight segments in the character (e.g., = has two straight lines, / has only one straight line).

Once these structures have been determined, they are indexed to provide a structural index to character properties.

The recovery phase of the method uses the structural data developed in the learning phase to recover character information from the design. Prior to the main recovery processing, the method unlinks all objects, links all completely overlapping objects, straighten objects to reduce the number of segments. The main recovery processing is performed as follows. The program iterates over all contour objects in the design. For each object, if the bounding box of the object is smaller then the smallest printable unit for the selected printing process then skip to the next object. Otherwise, determine properties 1, 2, and 3 for the contour object and use the indexes to determine the set of characters that match the determined properties 1, 2, and 3. Call this set SET1. If SET1 is empty then skip to next contour object. Otherwise, calculate properties 4 through 7 of the contour object, and find the subset of characters in SET1 whose vector (i.e., property 4) matches the vector of the current contour object. Call this subset SET2. If SET2 is empty then skip to the next object. Otherwise find the character in SET2 that is closest to the current contour object by comparing properties 5 and 6 to those of the characters in SET2. If no character is near the contour object, then skip to the next object. If only one character is near the contour object, then the character has been identified. If several characters are near the contour object, then ask the user to choose the correct character.

The above method for recovering text data permits the program to then check if the design conforms to legal design rules involving text requirements. It also enables the program to check other design rules involving text.

Style Rules

Many companies have certain particular styles for packaging in order to give a consistent look to a product line. A company style might also be used to give company reports, letterhead, advertisements, logos, etc. a consistent look and feel. For example, there may be certain company colors used for particular purposes or the logo may be required to have specific colors. Such company style design rules can be created and stored so that they may be conveniently activated whenever a design is being produced for a particular company. Template constraints may include rules such as certain types of elements that must be present in a design, certain types of elements that are not allowed, restrictions on the attributes of certain classes of objects, and restrictions on relations between certain classes of objects. A simple method to check a design for conformity with a template defining certain style rules scans the design and matches elements of the template with elements in the design.

Aesthetic Rules

The preferred embodiment of the invention also provides for checking a design for conformity with a set of aesthetic rules. For example, a design may be checked for aesthetic compatibility between different fonts used or may check for the use of more legible fonts or more creative fonts depending on the type of design. Aesthetic rules can also assist in providing the design with balance related to colors, shapes, and other properties of and between objects. For example, one type of aesthetic design rule is based on color harmony. When the human eye perceive a color, then complementary colors are required by the eye in order to produce a certain harmony. Color harmony may include, for example, a check for color-by-color contrast, for light-dark contrast, for cold-warm contrast, for complementary contrast, for simultaneous contrast, for color quality contrast, and for color quantity contrast. For each of these types of contrast, the program compares each visible object with any visible background object for compliance with the color contrast rule.

Consumer Behavior and other Design Rules

The preferred embodiment may also be configured to include checks for compliance of a design to certain design rules related to consumer behavior.

Consumer behavior research may be used to define certain design properties that have commercial advantage. For example, a green color for a detergent package may result in increased sales among environmentally conscious consumers. These types of design constraints may be incorporated into the design rule check, including dependence upon the targeted consumers.

It is obvious from the foregoing description that many other types of design rules may be added in a similar manner so as to provide the program with many additional advantages to the graphic designer, the commercial printer, and others involved in graphic design. Thus the scope of the invention is not to be limited by the specific examples of design rules described herein, nor is it to be limited to the particular methods for checking a design for conformity to these rules. Accordingly, the scope of the invention should be determined by the following claims and their legal equivalents.

What is claimed is:

1. In a digital computer a method of processing graphical data representing a plurality of graphical objects, the method comprising:

identifying a subset of the graphical data representing a graphical object, wherein the graphical object is in violation of a graphical design rule, the graphical design rule being a printability rule for a specified printing process,; and modifying the subset of the data so that the graphical object conforms to the graphical design rule, wherein the printability rule for the specified printing process depends on one or more of: the type of printing process, the material printed upon, the print quality, and the specific printing device.

2. The method of claim 1 further comprising producing output comprising an explanation of how the graphical object violates the graphical design rule.

3. The method of claim 1 further comprising producing output comprising a suggested change to the object, wherein the suggested change would conform the graphical object to the graphical design rule.

4. The method of claim 1 further comprising producing output comprising an identification of the graphical object.

5. The method of claim 1 further comprising automatically modifying other graphical objects which are also in violation of the graphical design rule.

6. The method of claim 1 wherein the modifying step is performed upon user approval.

7. The method of claim 1 wherein the identifying step is performed interactively within a graphic design program whereby immediate design feedback is provided to the user during creation or editing of the graphical object.

8. The method of claim 1 wherein the identifying step is performed for all of the graphical objects represented by the graphical data without user intervention, whereby design rule violations are checked in a batch mode.

9. The method of claim 1 wherein the design rule comprises having an ink percentage above a minimum ink threshold and below a maximum ink percentage threshold.

10. The method of claim 1 wherein the design rule comprises having a continuous color gradation.

11. The method of claim 1 wherein the design rule comprises being a stroke that is not too thin for printing with the specified printing process.

12. The method of claim 1 wherein the design rule comprises not having parts that are too thin for printing with the specified printing process.

13. The method of claim 1 wherein the design rule comprises the object not being too close to another object.

14. The method of claim 1 further comprising determining the portion of the object that is visible.

15. The method of claim 1 further comprising determining a design rule based critical distance for the object, the critical distance being the maximum distance for violating the graphical design rule, the maximum distance being: in the case that the design rule comprises not having parts that are too thin for printing with the specified printing process, the maximum too-thin thinness; in the case that the design rule comprises being a stroke that is not too thin for printing with the specified printing process, the maximum too-thin thinness; and in the case that the design rule comprises the object not being too close to another object, the maximum distance for being too close.

16. The method of claim 1 further comprising determining if the object is isolated from other objects.

17. The method of claim 1 wherein the design rule comprises having properties of a die.

18. The method of claim 1 wherein the graphical design rule comprises bleeding at least a predetermined distance over the edge of a die.

19. The method of claim 1 further comprising classifying the object, determining its relationship with other objects, and matching aggregates of objects with a library of template compositions.

20. The method of claim 1 wherein the design rule comprises being visible.

21. The method of claim 1 wherein the design rule comprises a legal rule about text, and wherein the identifying step comprises recovering text data from contour data, the recovering determining one or more text characters from the contour data representing the text data in the packaging design.

22. The method of claim 1 wherein the specified printing process is one of a set of printing processes including offset printing, flexo printing, gravure printing, silk-screen printing, lithopress printing, and letterpress printing on a material chosen from the set of material including paper, carton, film and label.

23. The method of claim 1 wherein the graphical design rule is dependent on a set of printability parameters for the specified printing process.

24. The method of claim 23 wherein the printability parameters for the specified printing process include one or more of the set of parameters comprising minimum positive line width, minimum neagtive line width, the registration error, the maximum number of inks per press pass, the minimum color percentage, and the maximum color percentage.

* * * * *